(12) United States Patent
Oshida

(10) Patent No.: US 11,001,241 B2
(45) Date of Patent: May 11, 2021

(54) CONTROLLER, CONTROL METHOD, AND BRAKE SYSTEM

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/487,127

(22) PCT Filed: Jan. 30, 2018

(86) PCT No.: PCT/IB2018/050549
§ 371 (c)(1),
(2) Date: Aug. 20, 2019

(87) PCT Pub. No.: WO2018/154398
PCT Pub. Date: Aug. 30, 2018

(65) Prior Publication Data
US 2020/0017085 A1 Jan. 16, 2020

(30) Foreign Application Priority Data
Feb. 22, 2017 (JP) .............................. JP2017-031017

(51) Int. Cl.
*B60W 30/04* (2006.01)
*B60T 8/17* (2006.01)
(Continued)

(52) U.S. Cl.
CPC ........ *B60T 8/1706* (2013.01); *B60T 8/17554* (2013.01); *B60T 8/1763* (2013.01);
(Continued)

(58) Field of Classification Search
CPC .......... B60T 7/22; B60T 8/328; B60T 8/1706; B60T 8/3225; B60T 8/17551
(Continued)

(56) References Cited

U.S. PATENT DOCUMENTS 10,029,683 B1 * 7/2018 Ginther ................ B60W 10/04
10,099,667 B2 * 10/2018 Kajiyama ............ B60T 8/1706
(Continued)

FOREIGN PATENT DOCUMENTS

DE   102013012153   1/2014
EP       2738075    6/2014
(Continued)

OTHER PUBLICATIONS

International Search Report for Application No. PCT/IB2018/050549 dated May 11, 2018 (English Translation, 3 pages).

*Primary Examiner* — Christopher P Schwartz
(74) *Attorney, Agent, or Firm* — Michael Best & Friedrich LLP

(57) ABSTRACT

The invention obtains a controller and a control method capable of improving safety by automatic emergency deceleration action while suppressing a motorcycle from falling over. The invention also obtains a brake system that includes such a controller.

In the controller, the control method, and the brake system according to the invention, a control mode that causes the motorcycle to take the automatic emergency deceleration action is initiated in response to trigger information generated in accordance with peripheral environment of the motorcycle. In the control mode, automatic emergency deceleration that is deceleration of the motorcycle generated by the automatic emergency deceleration action is controlled in accordance with a change rate of a state amount that is related to posture of the motorcycle during turning travel.

12 Claims, 5 Drawing Sheets

(51) Int. Cl.
  *B60T 8/1755*   (2006.01)
  *B60T 8/1763*   (2006.01)
  *B60W 10/184*   (2012.01)

(52) U.S. Cl.
  CPC ........ *B60T 8/17558* (2013.01); *B60W 10/184* (2013.01); *B60W 2030/043* (2013.01); *B60W 2540/18* (2013.01)

(58) Field of Classification Search
  USPC .......... 303/9.64, 9.69, 9.71, 137; 701/70–72
  See application file for complete search history.

(56) References Cited

U.S. PATENT DOCUMENTS

| | | | |
|---|---|---|---|
| 10,435,016 B2* | 10/2019 | Watanabe | B60T 8/1755 |
| 2004/0098185 A1* | 5/2004 | Wang | B62K 21/00 |
| | | | 701/70 |
| 2013/0238206 A1* | 9/2013 | Lemejda | B60T 8/17554 |
| | | | 701/70 |
| 2013/0311075 A1* | 11/2013 | Tran | G08G 1/166 |
| | | | 701/117 |
| 2020/0017086 A1* | 1/2020 | Oshida | B60T 7/12 |
| 2020/0070789 A1* | 3/2020 | Oshida | B60W 10/184 |
| 2020/0189536 A1* | 6/2020 | Oshida | B60W 10/06 |

FOREIGN PATENT DOCUMENTS

| | | |
|---|---|---|
| EP | 2862764 | 4/2015 |
| GB | 2539759 | 12/2016 |
| JP | 2009116882 | 5/2009 |
| JP | 2010012903 A | 1/2010 |
| WO | 2012163567 | 12/2012 |
| WO | 2013146907 | 10/2013 |
| WO | 2016021607 | 2/2016 |

\* cited by examiner

CONTROLLER, CONTROL METHOD, AND BRAKE SYSTEM

BACKGROUND OF THE INVENTION

The present disclosure relates to a controller and a control method capable of improving safety by automatic emergency deceleration action while suppressing a motorcycle from falling over, and to a brake system that includes such a controller.

As a conventional technique related to a motorcycle, a technique of improving driver safety has been available.

For example, a driver assistance system is disclosed in JP-A-2009-116882. Based on information detected by a sensor device that detects an obstacle present in a travel direction or substantially in the travel direction, the driver assistance system warns a driver of the motorcycle that the motorcycle inappropriately approaches the obstacle.

SUMMARY OF THE INVENTION

By the way, in order to further improve the driver safety, it is considered to use a technique of avoiding a collision with the forward obstacle by causing the motorcycle to take automatic emergency deceleration action that is action to stop the motorcycle at a position before the forward obstacle without depending on a driver's operation. The motorcycle tends to have unstable posture when compared to a four-wheeled vehicle, for example. This leads to such a problem that the motorcycle possibly falls over due to deceleration of the motorcycle generated by the automatic emergency deceleration action.

The invention has been made with the above-described problem as the background and therefore obtains a controller and a control method capable of improving safety by automatic emergency deceleration action while suppressing a motorcycle from falling over. The invention also obtains a brake system that includes such a controller.

A controller according to the invention is a controller that controls behavior of a motorcycle, and includes: an acquisition section that acquires trigger information generated in accordance with peripheral environment of the motorcycle; and an execution section that initiates a control mode in response to the trigger information, the control mode causing the motorcycle to take automatic emergency deceleration action. The acquisition section acquires a change rate of a state amount that is related to posture of the motorcycle during turning travel. In the control mode, automatic emergency deceleration that is deceleration of the motorcycle generated by the automatic emergency deceleration action is controlled in accordance with the change rate.

A control method according to the invention is a control method that controls behavior of a motorcycle, includes: a first acquisition step of acquiring trigger information that is generated in accordance with peripheral environment of the motorcycle; and an execution step of initiating a control mode that causes the motorcycle to take automatic emergency deceleration action by a controller in response to the trigger information, and further includes a second acquisition step of acquiring a change rate of a state amount that is related to posture of the motorcycle during turning travel. In the control mode, automatic emergency deceleration that is deceleration of the motorcycle generated by the automatic emergency deceleration action is controlled in accordance with the change rate.

A brake system according to the invention is a brake system that includes: a peripheral environment sensor that detects peripheral environment of a motorcycle; and a controller that controls behavior of the motorcycle on the basis of the peripheral environment. The controller includes: an acquisition section that acquires trigger information generated in accordance with the peripheral environment; and an execution section that initiates a control mode in response to the trigger information, the control mode causing the motorcycle to take automatic emergency deceleration action. The acquisition section acquires a change rate of a state amount that is related to posture of the motorcycle during turning travel. In the control mode, automatic emergency deceleration that is deceleration of the motorcycle generated by the automatic emergency deceleration action is controlled in accordance with the change rate.

In the controller, the control method, and the brake system according to the invention, the control mode that causes the motorcycle to take the automatic emergency deceleration action is initiated in response to the trigger information generated in accordance with the peripheral environment of the motorcycle. In the control mode, the automatic emergency deceleration that is the deceleration of the motorcycle generated by the automatic emergency deceleration action is controlled in accordance with the change rate of the state amount that is related to the posture of the motorcycle during the turning travel. In this way, the automatic emergency deceleration can appropriately be controlled in accordance with the posture of the motorcycle. Therefore, safety can be improved by the automatic emergency deceleration action while the motorcycle is suppressed from falling over.

DETAILED DESCRIPTION

Figure 1:
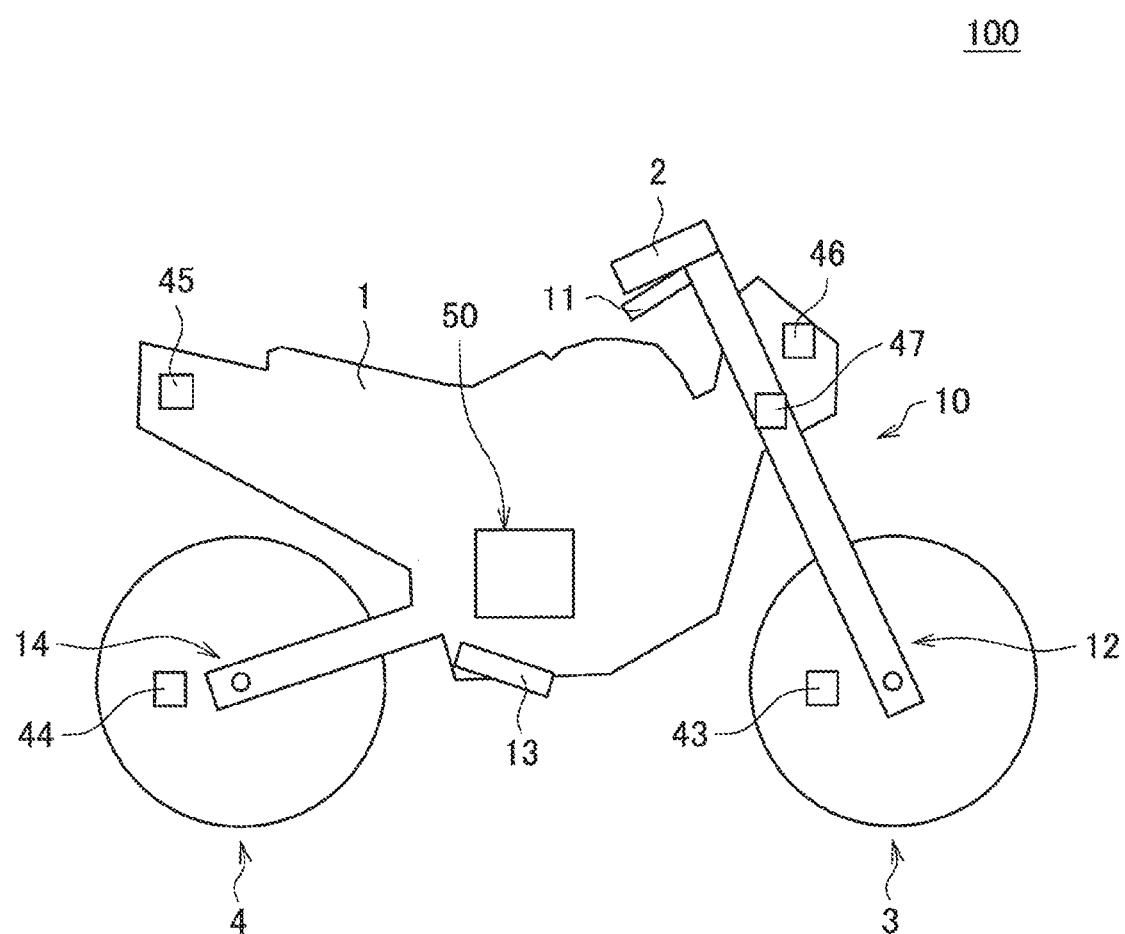
FIG. 1 is a schematic view of one example of an outline configuration of a motorcycle on which a brake system according to an embodiment of the invention is mounted.

A description will hereinafter be made on a controller, a control method, and a brake system according to the invention by using the drawings. Note that a description will hereinafter be made on a case where a motorcycle is a two-wheeled motor vehicle; however, the motorcycle may be another motorcycle such as a three-wheeled motor vehicle. A description will also be made on a case where each of a front-wheel brake mechanism and a rear-wheel brake mechanism is provided in one unit; however, at least one of the front-wheel brake mechanism and the rear-wheel brake mechanism may be provided in multiple units.

In addition, each of a configuration, action, and the like, which will be described below, is merely one example. The controller, the control method, and the brake system according to the invention are not limited to a case with such a configuration, such action, and the like.

Furthermore, the same or similar description will appropriately be simplified or will not be made. In the drawings, the same or similar members or portions will not be denoted by a reference sign or will be denoted by the same reference sign. In addition, a detailed structure will appropriately be depicted in a simplified manner or will not be depicted.

<Configuration of Brake System>

Figure 2:
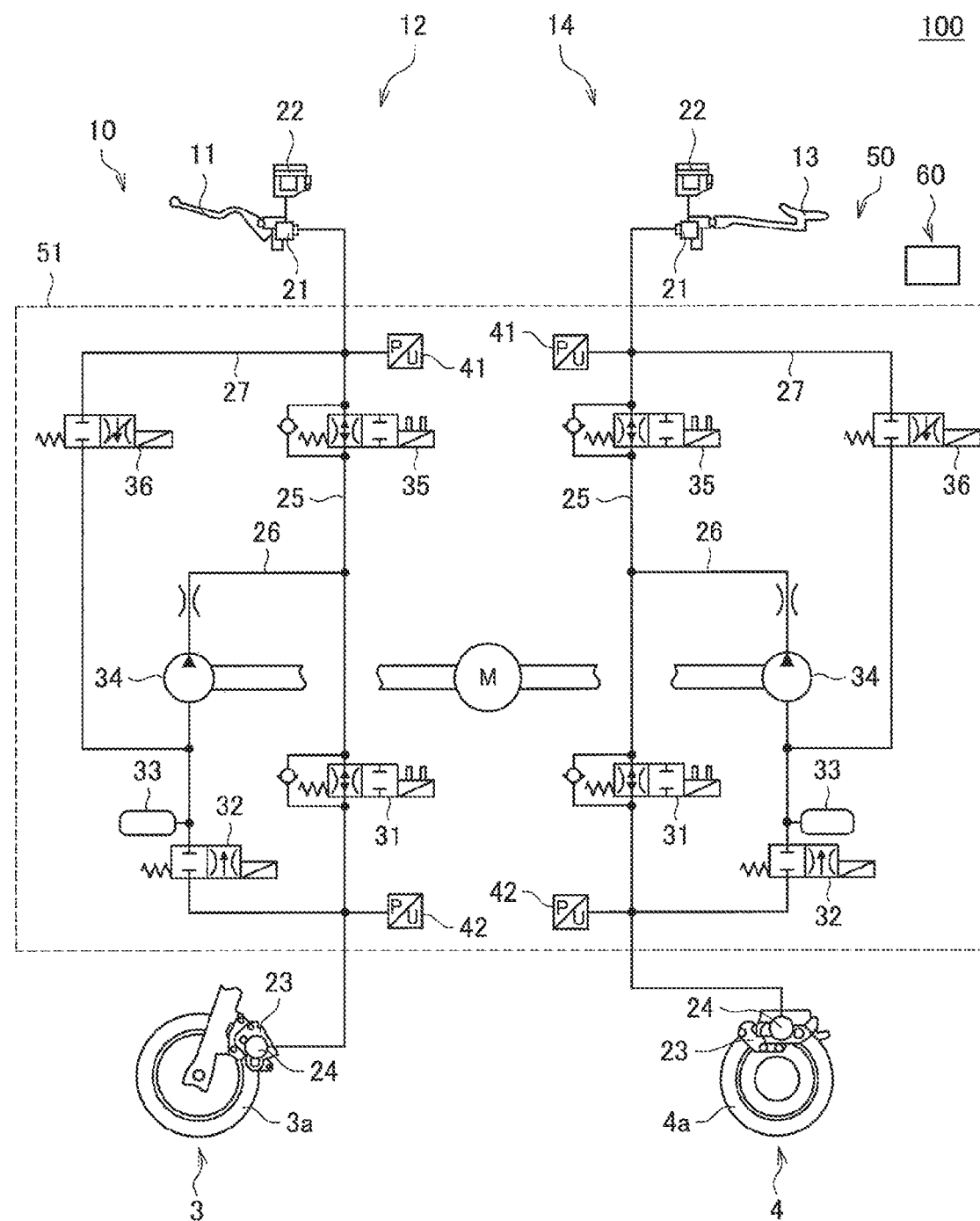
FIG. 2 is a schematic view of one example of an outline configuration of the brake system according to the embodiment of the invention.
Figure 3:
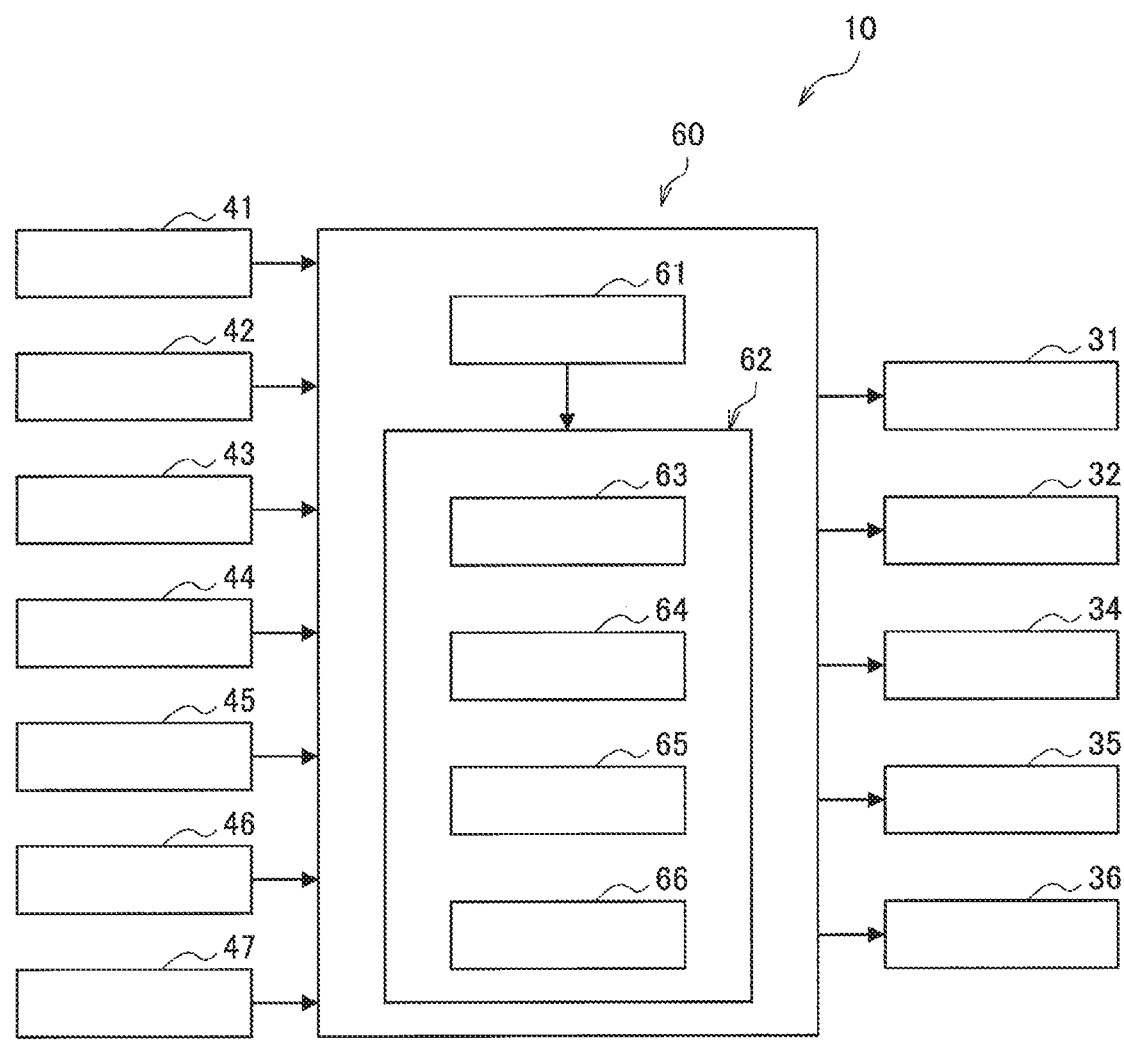
FIG. 3 is a block diagram of one example of a functional configuration of a controller according to the embodiment of the invention.
Figure 4:
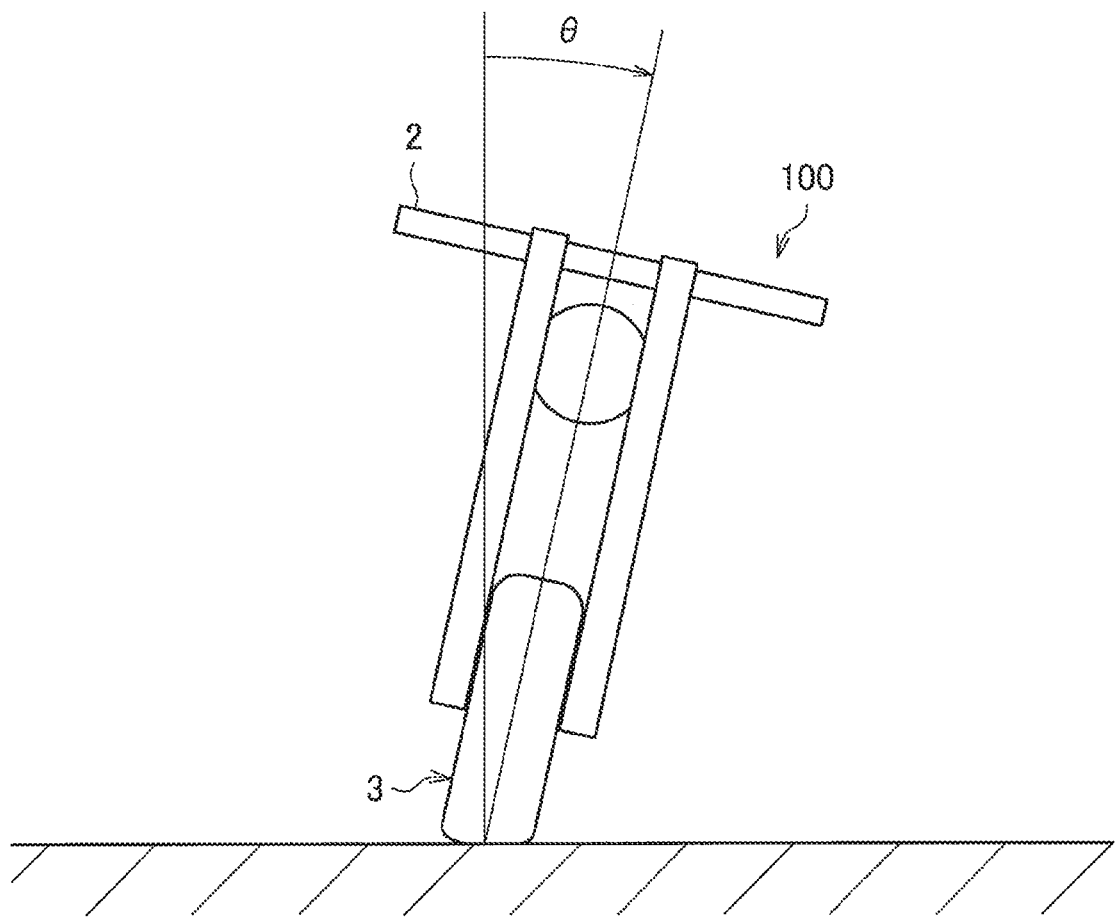
FIG. 4 is a view that explains a lean angle.

A description will be made on a configuration of a brake system 10 according to an embodiment of the invention. FIG. 1 is a schematic view of one example of an outline configuration of a motorcycle 100 on which the brake system 10 according to the embodiment of the invention is mounted. FIG. 2 is a schematic view of one example of an outline configuration of the brake system 10 according to the embodiment of the invention. FIG. 3 is a block diagram of one example of a functional configuration of a controller 60 according to the embodiment of the invention. FIG. 4 is a view that explains a lean angle.

As depicted in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and operated by a driver's hand. The first brake operation section 11 is a brake lever, for example. The second brake operation section 13 is provided in a lower portion of the trunk 1 and operated by a driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. A first valve (USV) 35 is provided in a portion of the primary channel 25 between an end thereof on the master cylinder 21 side and a portion thereof to which a downstream end of the secondary channel 26 is connected. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and is closed in an energized state, for example. The outlet valve 32 is an electromagnetic valve that is closed in the unenergized state and is opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and the controller (ECU) 60. In the brake system 10, the hydraulic pressure control unit 50 is a unit that has a function of controlling a hydraulic pressure of the brake fluid in each of the wheel cylinders 24, that is, a braking force to be applied to the front wheel 3 by the front-wheel brake mechanism 12 and a braking force to be applied to the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, that is, in a state where automatic emergency deceleration action, which will be described below, is not taken, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) of the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not depicted) of the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby applied to the rear wheel 4.

As depicted in FIG. 2 and FIG. 3, the brake system 10 includes master-cylinder pressure sensors 41, wheel-cylinder pressure sensors 42, a front-wheel rotational frequency sensor 43, a rear-wheel rotational frequency sensor 44, a lean angle sensor 45, a peripheral environment sensor 46, and a steering angle sensor 47, for example. Each of the sensors is communicable with the controller 60.

The master-cylinder pressure sensor 41 detects a hydraulic pressure of the brake fluid in the master cylinder 21 and outputs a detection result. The master-cylinder pressure sensor 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

The wheel-cylinder pressure sensor 42 detects the hydraulic pressure of the brake fluid in the wheel cylinder 24 and outputs a detection result. The wheel-cylinder pressure sensor 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The front-wheel rotational frequency sensor 43 and the rear-wheel rotational frequency sensor 44 are respectively provided on the front wheel 3 and the rear wheel 4.

The lean angle sensor 45 detects a lean angle of the motorcycle 100 and an angular velocity of the lean angle thereof and outputs a detection result. For example, the lean angle corresponds to a tilt angle θ of the motorcycle 100 in a rolling direction with respect to an upper vertical direction depicted in FIG. 4. Note that a tilt of the motorcycle 100 in the rolling direction with respect to the upper vertical direction occurs during turning travel. More specifically, an inertial measurement unit (IMU) that includes a three-axis gyroscope sensor and a three-directional acceleration sensor is used as the lean angle sensor 45. The lean angle sensor 45 may detect another physical quantity that can substantially be converted to the lean angle of the motorcycle 100 and the angular velocity of the lean angle thereof. The lean angle sensor 45 is provided in the trunk 1.

The peripheral environment sensor 46 detects peripheral environment of the motorcycle 100. For example, as the peripheral environment, the peripheral environment sensor 46 detects a distance from the motorcycle 100 to a forward obstacle (for example, a preceding vehicle). The peripheral environment sensor 46 may detect another physical quantity that can substantially be converted to the distance from the motorcycle 100 to the forward obstacle. More specifically, a camera that captures an image in front of the motorcycle 100 or a distance measurement sensor that can detect the distance from the motorcycle 100 to the forward obstacle is used as the peripheral environment sensor 46. The peripheral environment sensor 46 is provided in a front portion of the trunk 1.

In addition, the peripheral environment sensor 46 generates trigger information in accordance with the peripheral environment and outputs the trigger information. The trigger information is used to determine initiation of a control mode, which will be described below. For example, the peripheral environment sensor 46 computes a vehicle body speed of the motorcycle 100 on the basis of the rotational frequencies of the front wheel 3 and the rear wheel 4, and predicts duration before arrival that is duration before the motorcycle 100 reaches the forward obstacle on the basis of the distance from the motorcycle 100 to the forward obstacle and the vehicle body speed. The peripheral environment sensor 46 generates the trigger information when the duration before the arrival is shorter than reference duration. The reference duration is set in accordance with estimated duration before the motorcycle 100 is stopped in the case where the motorcycle 100 takes the automatic emergency deceleration action.

Furthermore, the peripheral environment sensor 46 computes reference target deceleration in conjunction with generation of the trigger information and outputs a computation result. The reference target deceleration is a reference value of a target value of automatic emergency deceleration that is deceleration of the motorcycle 100 generated by the automatic emergency deceleration action. The reference target deceleration is deceleration that allows the motorcycle 100 to be stopped before the forward obstacle by the automatic emergency deceleration action, and is computed on the basis of the distance from the motorcycle 100 to the forward obstacle and the vehicle body speed, for example.

The steering angle sensor 47 detects a steering angle of the motorcycle 100 and an angular velocity of the steering angle thereof and outputs a detection result. The steering angle sensor 47 may detect another physical quantity that can substantially be converted to the steering angle of the motorcycle 100 and the angular velocity of the steering angle thereof. The steering angle sensor 47 is provided on the handlebar 2.

The controller 60 controls behavior of the motorcycle 100. The controller 60 includes an acquisition section 61 and an execution section 62, for example. The acquisition section 61 acquires information output from each of the sensors and outputs the acquired information to the execution section 62. The execution section 62 includes a control section 63, a trigger determination section 64, a change rate determination section 65, and a lean angle determination section 66, for example. Each of the determination sections executes determination processing by using the information that is output from each of the sensors. In accordance with a determination result by the trigger determination section 64, the execution section 62 initiates the control mode that causes the motorcycle 100 to take the automatic emergency deceleration action. In the control mode, the control section 63 outputs a command that governs action of each of the inlet valves 31, the outlet valves 32, the pumps 34, the first valves 35, the second valves 36, and the like in accordance with the determination result by each of the determination sections, so as to control the automatic emergency deceleration that is the deceleration of the motorcycle 100 generated by the automatic emergency deceleration action.

More specifically, in the control mode, the control section 63 controls the automatic emergency deceleration in accordance with a change rate of a state amount that is related to posture of the motorcycle 100 during the turning travel. Alternatively, in the control mode, the control section 63 may control the automatic emergency deceleration in accordance with the lean angle of the motorcycle 100. Note that the control of the automatic emergency deceleration includes control to permit or prohibit the automatic emergency deceleration action in addition to the control of the automatic emergency deceleration of the motorcycle 100 that is generated during the automatic emergency deceleration action.

The controller 60 includes a storage element, and the information such as the reference values that is used in each of the processing executed by the controller 60 may be stored in the storage element in advance.

<Action of Brake System>

Figure 5:
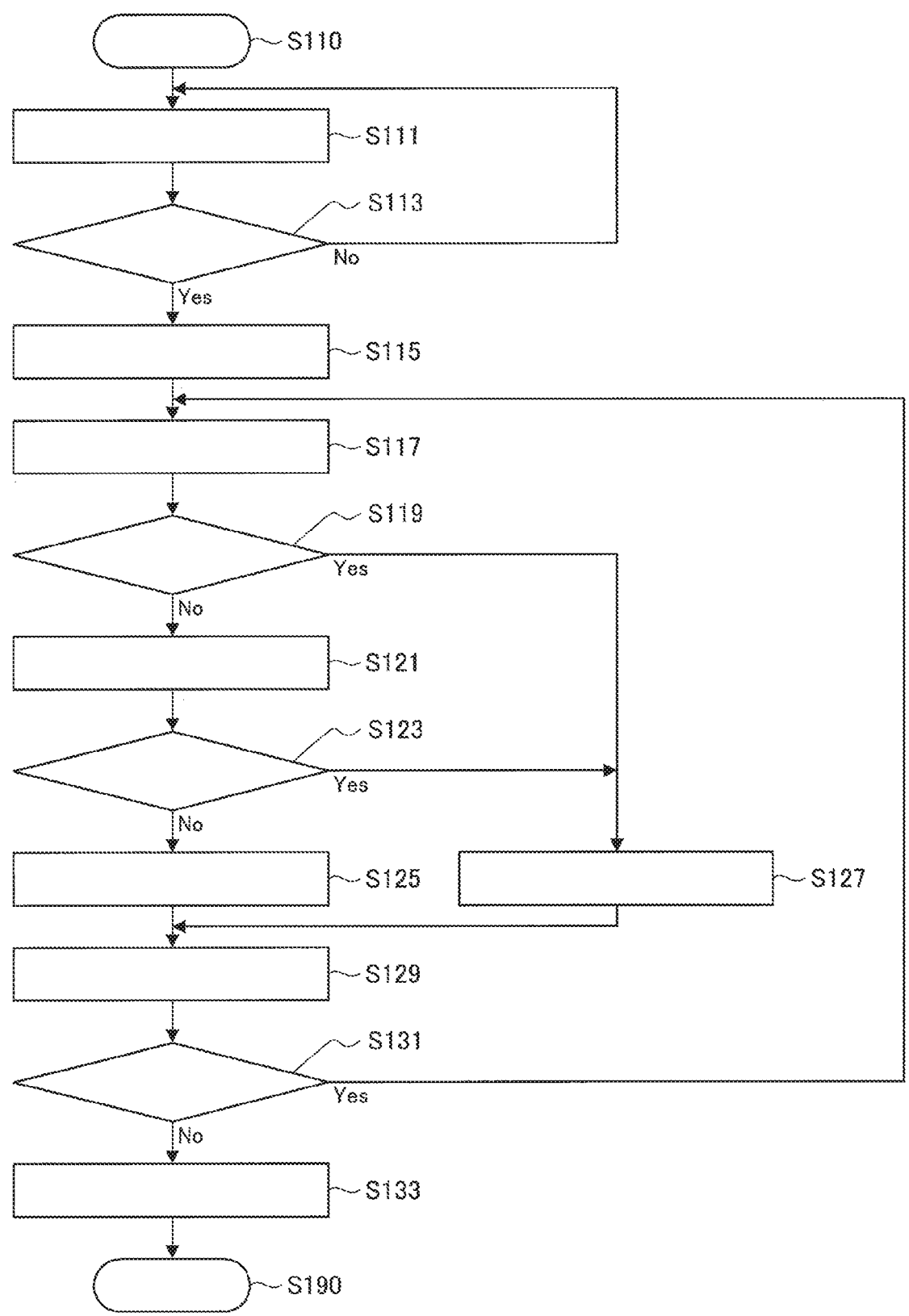
FIG. 5 is a flowchart of one example of processing that is executed by the controller according to the embodiment of the invention.

A description will be made on action of the brake system 10 according to the embodiment of the invention. FIG. 5 is a flowchart of one example of processing that is executed by the controller 60 according to the embodiment of the invention. A control flow depicted in FIG. 5 is repeated during activation of the brake system 10 (in other words, during an operation of the motorcycle 100). Step S110 and step S190 in FIG. 5 respectively correspond to initiation and termination of the control flow. Note that, in step S110, the control flow is initiated in a state where the control mode is not initiated.

In step S111, the acquisition section 61 acquires the trigger information. Note that the case where the peripheral environment sensor 46 generates the trigger information has been described above; however, the controller 60 may generate the trigger information. For example, the detection result of the distance from the motorcycle 100 to the forward obstacle may be output from the peripheral environment sensor 46 to the controller 60, and the controller 60 may generate the trigger information on the basis of the distance from the motorcycle 100 to the forward obstacle and the vehicle body speed of the motorcycle 100. In this way, the acquisition section 61 can acquire the trigger information.

Next, in step S113, the trigger determination section 64 determines whether the trigger information has been acquired. If it is determined that the trigger information has been acquired (step S113/Yes), the processing proceeds to step S115. On the other hand, if it is determined that the trigger information has not been acquired (step S113/No), the processing returns to step S111.

In step S115, the execution section 62 initiates the control mode that causes the motorcycle 100 to take the automatic emergency deceleration action.

Next, in step S117, the acquisition section 61 acquires the change rate of the state amount that is related to the posture of the motorcycle 100 during the turning travel. The state amount that is related to the posture of the motorcycle 100 during the turning travel includes the lean angle, the angular velocity of the lean angle, the steering angle, or the angular velocity of the steering angle, for example.

Next, in step S119, the change rate determination section 65 determines whether the change rate of the state amount that is related to the posture of the motorcycle 100 during the turning travel exceeds a change rate reference value. If it is determined that the change rate exceeds the change rate reference value (step S119/Yes), the processing proceeds to step S127. On the other hand, if it is determined that the change rate does not exceed the change rate reference value (step S119/No), the processing proceeds to step S121. The change rate reference value is set to such a value that a determination on whether the driver has his/her intention to avoid the forward obstacle can be made.

In step S121, the acquisition section 61 acquires the lean angle of the motorcycle 100.

Next, in step S123, the lean angle determination section 66 determines whether the lean angle of the motorcycle 100 exceeds a lean angle reference value. If it is determined that the lean angle exceeds the lean angle reference value (step S123/Yes), the processing proceeds to step S127. On the other hand, if it is determined that the lean angle does not exceed the lean angle reference value (step S123/No), the processing proceeds to step S125. The lean angle reference value is such a value that a determination on whether a possibility of falling of the motorcycle 100, which is resulted from the generation of the deceleration of the motorcycle 100, is excessively high can be made, and is set in accordance with a friction coefficient of a travel road surface, a design specification of the motorcycle 100, and the like, for example.

In step S125, the control section 63 permits the automatic emergency deceleration action. Once permitting the automatic emergency deceleration action, the control section 63 causes the generation of the automatic emergency deceleration that is the deceleration independent of the driver's operation, and causes the motorcycle 100 to take the automatic emergency deceleration action. For example, the control section 63 causes the generation of the automatic emergency deceleration through generation of the braking force that is applied to the wheel by at least one of the front-wheel brake mechanism 12 and the rear-wheel brake mechanism 14. More specifically, the control section 63 drives the pump 34 in a state where the inlet valve 31 is opened, the outlet valve 32 is closed, the first valve 35 is closed, and the second valve 36 is opened, so as to cause the generation of the braking force that is applied to the wheel.

The control section 63 controls the braking force that is applied to the wheel by controlling a rotational frequency of the pump 34. More specifically, the control section 63 decides target deceleration on the basis of the reference target deceleration that is output from the peripheral environment sensor 46. For example, the control section 63 decides a value that is obtained by multiplying the reference target deceleration by a coefficient as the target deceleration. Then, based on the target deceleration, the control section 63 decides a target hydraulic pressure that is a target value of the hydraulic pressure of the brake fluid in the wheel cylinder 24. Thereafter, the control section 63 controls the rotational frequency of the pump 34 such that the hydraulic pressure of the brake fluid in the wheel cylinder 24 matches the target hydraulic pressure. In this way, the automatic emergency deceleration is controlled to match the target deceleration.

For example, in the case where the lean angle is large, the control section 63 causes the motorcycle 100 to take the automatic emergency deceleration action in which the automatic emergency deceleration is lower than the automatic emergency deceleration in the automatic emergency deceleration action that is taken when the lean angle is small. More specifically, the control section 63 decides the value that is obtained by multiplying the reference target deceleration by the coefficient as the target deceleration, and the coefficient becomes smaller as the lean angle is increased. In this way, the control section 63 controls the automatic emergency deceleration.

Alternatively, for example, in the case where the change rate of the state amount that is related to the posture of the motorcycle 100 during the turning travel is high, the control section 63 causes the motorcycle 100 to take the automatic emergency deceleration action in which the automatic emergency deceleration is lower than the automatic emergency deceleration in the automatic emergency deceleration action that is taken when the change rate is low. More specifically, the control section 63 decides a value that is obtained by multiplying the reference target deceleration by the coefficient as the target deceleration, and the coefficient becomes smaller as the change rate of the state amount that is related to the posture of the motorcycle 100 during the turning travel is increased. In this way, the control section 63 controls the automatic emergency deceleration.

The control section 63 may decide the target deceleration in accordance with both of the lean angle and the change rate of the state amount that is related to the posture of the motorcycle 100 during the turning travel. In such a case, the control section 63 decides a value that is obtained by multiplying the reference target deceleration by both of the coefficient corresponding to the lean angle and the coefficient corresponding to the change rate of the state amount as the target deceleration, for example.

Note that the case where the control section 63 controls the automatic emergency deceleration by controlling the braking force that is applied to the wheel has been described above; however, the control section 63 may control the automatic emergency deceleration by controlling engine output of the motorcycle 100. More specifically, the control section 63 may control the automatic emergency deceleration by using an operational effect of engine brake that is exerted when the engine output is lowered. Alternatively, the control section 63 may control the automatic emergency deceleration by controlling both of the braking force that is applied to the wheel and the engine output.

In step S127, the control section 63 prohibits the automatic emergency deceleration action. When the automatic emergency deceleration action is prohibited, the control section 63 brings the motorcycle 100 into the normal state where the deceleration is generated in accordance with the driver's operation. More specifically, the control section 63 brings the motorcycle 100 into a state where the inlet valves 31 are opened, the outlet valves 32 are closed, the first valves 35 are opened, and the second valves 36 are closed, so as to prohibit driving of the pumps 34.

Following step S125 or step S127, in step S129, the acquisition section 61 acquires the trigger information.

Next, in step S131, the trigger determination section 64 determines whether the trigger information has been acquired. If it is determined that the trigger information has been acquired (step S131/Yes), the processing returns to step S117. On the other hand, if it is determined that the trigger information has not been acquired (step S131/No), the processing proceeds to step S133.

As described above, if it is determined in step S131 that the trigger information has been acquired (step S131/Yes), the control mode continues, and the processing from step S117 to step S129 is repeated. In the case where the control mode continues, the control section 63 appropriately switches between a state where the automatic emergency deceleration action is permitted and a state where the automatic emergency deceleration action is prohibited in accordance with the determination results of the determination processing by the change rate determination section 65 or the lean angle determination section 66 (step S119 and step S123).

In the case where both of the determination results in step S119 and step S123 are No in the state where the automatic emergency deceleration action is permitted, the control section 63 continues the state where the automatic emergency deceleration action is permitted. In this case, for example, the control section 63 controls the automatic emergency deceleration of the motorcycle 100, which is generated during the automatic emergency deceleration action, in accordance with the lean angle acquired during the automatic emergency deceleration action. In addition, for example, the control section 63 controls the automatic emergency deceleration of the motorcycle 100 generated during the automatic emergency deceleration action in accordance with the change rate of the state amount that is related to the posture of the motorcycle 100 during the turning travel and that is acquired during the automatic emergency deceleration action.

In the case where at least one of the determination results in step S119 and step S123 is Yes in the state where the automatic emergency deceleration action is permitted, the control section 63 cancels the state where the automatic emergency deceleration action is permitted, and prohibits the automatic emergency deceleration action. For example, in the case where the change rate of the state amount that is related to the posture of the motorcycle 100 during the turning travel and that is acquired during the automatic emergency deceleration action exceeds the change rate reference value, the control section 63 cancels the state where the automatic emergency deceleration action is permitted, and prohibits the automatic emergency deceleration action. Alternatively, for example, in the case where the lean angle that is acquired during the automatic emergency deceleration action exceeds the lean angle reference value, the control section 63 cancels the state where the automatic emergency deceleration action is permitted, and prohibits the automatic emergency deceleration action.

In the case where at least one of the determination results in step S119 and step S123 is Yes in the state where the automatic emergency deceleration action is prohibited, the control section 63 continues the state where the automatic emergency deceleration action is prohibited.

In the case where both of the determination results in step S119 and step S123 are No in the state where the automatic emergency deceleration action is prohibited, the control section 63 cancels the state where the automatic emergency deceleration action is prohibited, and permits the automatic emergency deceleration action. For example, in the cases where the determination result in step S119 is No and the lean angle that is acquired during the prohibition of the automatic emergency deceleration action falls below the lean angle reference value, the control section 63 cancels the state where the automatic emergency deceleration action is prohibited, and permits the automatic emergency deceleration action. Note that the determination processing in step S119 may be removed from the control flow depicted in FIG. 5. In such a case, in the case where the lean angle that is acquired during the prohibition of the automatic emergency deceleration action falls below the lean angle reference value, the control section 63 cancels the state where the automatic emergency deceleration action is prohibited, and permits the automatic emergency deceleration action.

In step S133, the execution section 62 terminates the control mode.

<Effects of Brake System>

A description will be made on effects of the brake system 10 according to the embodiment of the invention.

In the brake system 10, the control mode that causes the motorcycle 100 to take the automatic emergency deceleration action is initiated in response to the trigger information that is generated in accordance with the peripheral environment of the motorcycle 100. In the control mode, the automatic emergency deceleration is controlled in accordance with the change rate of the state amount that is related to the posture of the motorcycle 100 during the turning travel. In this way, the automatic emergency deceleration can appropriately be controlled in accordance with the posture of the motorcycle 100. Therefore, the safety can be improved by the automatic emergency deceleration action while the motorcycle 100 is suppressed from falling over.

Preferably, in the control mode, the brake system 10 prohibits the automatic emergency deceleration action in the case where the change rate of the state amount that is related to the posture of the motorcycle 100 during the turning travel exceeds the change rate reference value. In this way, in the case where it is predicted that the driver has his/her intention to avoid the forward obstacle, the automatic emergency deceleration action can be prohibited. Thus, the generation of the automatic emergency deceleration against the driver's intention can be suppressed. Therefore, the motorcycle 100 can effectively be suppressed from falling over.

Note that, in the control mode, the control section 63 may prohibit the automatic emergency deceleration action in the case where an operation amount that is related to the driver's operation of the motorcycle 100 exceeds an operation amount reference value. The driver's operation of the motorcycle 100 includes an accelerator pedal operation, a brake operation, and a clutch operation, for example. The operation amount reference value is set to such a value that a determination on whether the driver has operated the motorcycle 100 can be made. Accordingly, in the case where the operation amount exceeds the operation amount reference value, the automatic emergency deceleration action is prohibited. In this way, the generation of the automatic emergency deceleration against the driver's operation of the motorcycle 100 can be suppressed. Therefore, the motorcycle 100 can effectively be suppressed from falling over.

In addition, in the control mode, in the case where the change rate of the state amount that is related to the posture of the motorcycle 100 during the turning travel exceeds the change rate reference value, the control section 63 may reduce the operation amount reference value in comparison with the case where the change rate does not exceed the change rate reference value. In this way, in the case where it is predicted that the driver has his/her intention to avoid the forward obstacle, sensitivity to detection of the driver's operation of the motorcycle 100 can be improved. Therefore, the automatic emergency deceleration action can further reliably be prohibited.

Preferably, in the control mode, in the case where the change rate of the state amount that is related to the posture of the motorcycle 100 during the turning travel is high, the automatic emergency deceleration action is taken in the brake system 10, and the automatic emergency deceleration therein is lower than the automatic emergency deceleration in the automatic emergency deceleration action that is taken when the change rate is low. Here, it is predicted that the possibility that the driver has his/her intention to avoid the forward obstacle is increased as the change rate of the state amount is increased. Accordingly, in the case where the change rate of the state amount is high, the automatic emergency deceleration action is taken, and the automatic emergency deceleration therein is lower than the automatic emergency deceleration in the automatic emergency deceleration action that is taken when the change rate is low. In this way, the automatic emergency deceleration can appropriately be controlled in accordance with the possibility that the driver has his/her intention to avoid the forward obstacle. Therefore, falling of the motorcycle 100, which is resulted from the generation of the automatic emergency deceleration against the driver's intention, can be suppressed.

Preferably, in the control mode, the automatic emergency deceleration of the motorcycle 100 generated during the automatic emergency deceleration action is controlled in the brake system 10 in accordance with the change rate of the state amount that is related to the posture of the motorcycle 100 during the turning travel and that is acquired during the automatic emergency deceleration action. In this way, the automatic emergency deceleration of the motorcycle 100, which is during the automatic emergency deceleration action, can appropriately be controlled in accordance with the change of the change rate of the state amount over time during the automatic emergency deceleration action. Therefore, falling of the motorcycle 100, which is resulted from the generation of the automatic emergency deceleration against the driver's intention, can effectively be suppressed.

Preferably, the state amount that is related to the posture of the motorcycle 100 during the turning travel and that is used for the control of the automatic emergency deceleration includes the lean angle of the motorcycle 100 or the angular velocity of the lean angle thereof. In this way, the automatic emergency deceleration can be controlled by using the detection result that is output from the lean angle sensor 45. Thus, another sensor (for example, the steering angle sensor 47) can be removed from the configuration of the brake system 10. Therefore, the brake system 10 can be simplified.

Preferably, in the control mode, the brake system 10 controls the automatic emergency deceleration in accordance with the lean angle of the motorcycle 100 during the turning travel. In this way, the automatic emergency deceleration can further appropriately be controlled in accordance with the posture of the motorcycle 100. Therefore, the effect of improving the safety by the automatic emergency deceleration action can further be enhanced while the motorcycle 100 is suppressed from falling over.

Preferably, in the control mode, in the case where the lean angle is large, the automatic emergency deceleration action is taken in the brake system 10, and the automatic emergency deceleration therein is lower than the automatic emergency deceleration in the automatic emergency deceleration action that is taken when the lean angle is small. Here, grounding areas of tires of the motorcycle 100 are reduced as the lean angle is increased. In addition, a friction characteristic in a grounding portion of each of the tires of the motorcycle 100 possibly has such a characteristic that a friction force is less likely to be generated in an advancing direction as the lean angle is increased. Accordingly, the possibility of falling of the motorcycle 100, which is resulted from the generation of the deceleration of the motorcycle 100, tends to be increased as the lean angle is increased. Thus, in the case where the lean angle is large, the automatic emergency deceleration action is taken, and the automatic emergency deceleration therein is lower than the automatic emergency deceleration in the automatic emergency deceleration action that is taken when the lean angle is small. In this way, the motorcycle 100 can effectively be suppressed from falling over.

Preferably, in the control mode, the brake system 10 controls the automatic emergency deceleration of the motorcycle 100, which is generated during the automatic emergency deceleration action, in accordance with the lean angle acquired during the automatic emergency deceleration action. In this way, the automatic emergency deceleration of the motorcycle 100, which is generated during the automatic emergency deceleration action, can appropriately be controlled in accordance with a change in the lean angle over time during the automatic emergency deceleration action. For example, the automatic emergency deceleration can be increased along with a decrease in the lean angle that is resulted from the automatic emergency deceleration action. As a result, an increase in a braking distance can be suppressed while the motorcycle 100 is suppressed from falling over. Therefore, the effect of increasing the safety can be enhanced by the automatic emergency deceleration action.

Preferably, in the control mode, the brake system 10 prohibits the automatic emergency deceleration action in the case where the lean angle exceeds the lean angle reference value. In this way, in the case where the possibility of falling of the motorcycle 100, which is resulted from the generation of the deceleration of the motorcycle 100, is excessively high, the automatic emergency deceleration action can be prohibited. Therefore, the motorcycle 100 can effectively be suppressed from falling over.

Preferably, in the control mode, the brake system 10 permits the automatic emergency deceleration action in the case where the lean angle, which is acquired during the prohibition of the automatic emergency deceleration action, falls below the lean angle reference value. In this way, in the case where the possibility of falling of the motorcycle 100, which is resulted from the generation of the deceleration of the motorcycle 100, becomes relatively low during the prohibition of the automatic emergency deceleration action, the automatic emergency deceleration action can appropriately be taken. Therefore, the effect of improving the safety by the automatic emergency deceleration action can be enhanced.

The invention is not limited to each of the embodiments described above. For example, all or parts of the embodiments may be combined, or only a part of each of the embodiments may be implemented. In addition, an order of the steps may be switched, for example.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational frequency sensor
44: Rear-wheel rotational frequency sensor
45: Lean angle sensor
46: Peripheral environment sensor
47: Steering angle sensor
50: Hydraulic pressure control unit
51: Base body
60: Controller
61: Acquisition section
62: Execution section
63: Control section
64: Trigger determination section
65: Change rate determination section
66: Lean angle determination section
100: Motorcycle

The invention claimed is:

1. A controller (60) that controls behavior of a motorcycle (100), the controller comprising:
an acquisition section (61) that acquires trigger information generated in accordance with a peripheral environment of the motorcycle (100); and
an execution section (62) that initiates a control mode in response to the trigger information, the control mode causing the motorcycle (100) to take automatic emergency deceleration action, wherein
during the control mode
the acquisition section (61) acquires a rate of change that is related to a posture of the motorcycle (100) during turning, and
automatic emergency deceleration generated by the automatic emergency deceleration action is controlled in accordance with the rate of change.

2. The controller according to claim 1, wherein
in the control mode, in the case where the rate of change exceeds a rate of change reference value, the automatic emergency deceleration action is prohibited.

3. The controller according to claim 1, wherein
in the control mode, in the case where the rate of change is high, the automatic emergency deceleration action is taken, and the automatic emergency deceleration therein is lower than the automatic emergency deceleration in the automatic emergency deceleration action that is taken when the rate of change is low.

4. The controller according to claim 3, wherein
in the control mode, the automatic emergency deceleration of the motorcycle (100), which is generated during the automatic emergency deceleration action, is controlled in accordance with the rate of change acquired during the automatic emergency deceleration action.

5. The controller according to claim 1, wherein
the rate of change includes a lean angle of the motorcycle (100).

6. The controller according to claim 1, wherein
the rate of change includes an angular velocity of the lean angle of the motorcycle (100).

7. The controller according to claim 1, wherein
the rate of change includes a steering angle of the motorcycle (100).

8. The controller according to claim 1, wherein
the rate of change includes an angular velocity of the steering angle of the motorcycle (100).

9. The controller according to claim 1, wherein
in the control mode, the automatic emergency deceleration is controlled by controlling a braking force that is applied to a wheel (3, 4) of the motorcycle (100).

10. The controller according to claim 1, wherein
in the control mode, the automatic emergency deceleration is controlled by controlling engine output of the motorcycle (100).

11. A control method that controls behavior of a motorcycle (100), the control method comprising:
a first acquisition step (S111) of acquiring trigger information that is generated in accordance with a peripheral environment of the motorcycle (100); and
an execution step (S115) of initiating a control mode by a controller (60) in response to the trigger information, the control mode causing the motorcycle (100) to take automatic emergency deceleration action, the control mode further comprising:
a second acquisition step (S117) of acquiring a rate of change that is related to posture of the motorcycle (100) during turning, wherein
in the control mode, automatic emergency deceleration generated by the automatic emergency deceleration action is controlled in accordance with the rate of change.

12. A brake system (10) comprising:
a peripheral environment sensor (46) that detects peripheral environment of a motorcycle (100); and
a controller (60) that controls behavior of the motorcycle (100) on the basis of the peripheral environment, wherein
the controller (60) includes:
an acquisition section (61) that acquires trigger information generated in accordance with the peripheral environment; and
an execution section (62) that initiates a control mode in response to the trigger information, the control mode causing the motorcycle (100) to take automatic emergency deceleration action, wherein during the control mode
- the acquisition section (61) acquires a rate of change that is related to a posture of the motorcycle (100) during turning, and
- automatic emergency deceleration generated by the automatic emergency deceleration action is controlled in accordance with the rate of change.

* * * * *